United States Patent [19]

Scheurenbrand et al.

[11] 4,423,746
[45] Jan. 3, 1984

[54] DEVICE FOR VENTING FUEL TANKS

[75] Inventors: Dieter Scheurenbrand, Ostfildern; Manfred Stotz, Aichwald, both of Fed. Rep. of Germany

[73] Assignee: Daimler-Benz Aktiengesellschaft, Fed. Rep. of Germany

[21] Appl. No.: 291,508

[22] Filed: Aug. 10, 1981

[30] Foreign Application Priority Data

Aug. 9, 1980 [DE] Fed. Rep. of Germany ....... 3030288

[51] Int. Cl.³ .................... B65D 90/34; F16K 17/12; F16K 17/194
[52] U.S. Cl. ........................................ 137/43; 137/45; 137/587; 220/85 VS; 220/85 S; 220/86 R
[58] Field of Search ................. 137/587, 43, 38, 45, 137/46; 220/86 R, 85 VR, 85 VS, 85 S; 244/135 R, 135 C

[56] References Cited

U.S. PATENT DOCUMENTS

| 2,529,341 | 11/1950 | Kailenta | 137/45 X |
| 2,874,712 | 2/1959 | Eshbaugh | 137/43 |
| 2,942,612 | 6/1960 | Klank, Jr. | 137/43 |
| 3,804,291 | 4/1974 | Fricker | 220/85 R |
| 4,166,550 | 9/1979 | Kleinschmit et al. | 220/85 UR |

FOREIGN PATENT DOCUMENTS

| 2019082 | 11/1970 | Fed. Rep. of Germany . | |
| 2363900 | 7/1975 | Fed. Rep. of Germany . | |
| 538104 | 6/1922 | France | 137/45 |
| 466335 | 5/1937 | United Kingdom | 137/38 |
| 775513 | 5/1957 | United Kingdom | 137/43 |

Primary Examiner—Allan N. Shoap
Attorney, Agent, or Firm—Craig & Burns

[57] ABSTRACT

A device for venting fuel tanks, especially of automotive vehicles, of the type having a volume equalizing vessel arranged in an upper zone of the interior of the fuel tank that communicates with the atmosphere is provided with inertial operated blocking members for sealing orifices into the equalizing vessel that are disposed at an upstream side of the orifices into the equalizing vessel relative to the interior of the tank. Additional venting conduits may be provided that are preferably inclined height wise and may either be mounted interiorly of the equalizing vessel so as to extend outwardly through an end wall thereof into close proximity with an end wall of the fuel tank or may be externally formed as a unitary formation of the equalizing vessel. An auxiliary sump chamber may be provided in a central portion of the auxiliary chamber bottom wall beneath the conduit venting the equalizing vessel to the atmosphere so as to ensure spillage therethrough during righting of a vehicle containing the fuel tank from an inverted position.

14 Claims, 2 Drawing Figures

DEVICE FOR VENTING FUEL TANKS

BACKGROUND AND SUMMARY OF THE INVENTION

The present invention relates to a device for venting fuel tanks, especially those of automotive vehicles. More particularly, the present invention relates to fuel venting tank arrangements wherein a volume equalizing vessel is arranged in an upper zone of the interior of the tank, the equalizing vessel being in communication with the atmosphere by way of an equalizing conduit and with the tank interior through connections that are sealable by way of blocking members that are adjustable in dependence upon inertial forces.

Fuel tanks must be vented in order to compensate for pressure differences between the interior of the tank and the atmosphere. Conduits terminating into the atmosphere are used in this connection for venting purposes; by way of these conduits, the evolving quantities of fuel vapor can be discharged independently of their magnitude, without fuel exiting from the tank.

A device of the above discussed type has been known (DOS [German Unexamined Laid-Open Application] No. 2,363,900) wherein a dome-shaped volume equalizing vessel is arranged symmetrically to the longitudinal plane of symmetry of a fuel tank; respectively, one conduit being extended from laterally located openings of the equalizing vessel up to almost the container end walls of the fuel tank and terminating via an orifice into the fuel tank. The openings of the vessel can be sealed in dependence on inertial forces by way of a sealing element with two blocking members associated therewith.

The conduits of the above-noted prior art device dip alternatingly into the fuel tank when the vehicle traverses curves of alternating directions. As a result, the conduits are gradually filled with fuel which is further conveyed into the volume equalizing vessel. In turn, since the volume equalizing vessel is of relatively small size, it is quickly filled up and thus the fuel may flow to the outside via the equalizing conduit.

The previously noted behavior takes place very quickly, especially if a large amount of fuel vapor forms in the fuel tank on account of very high outside temperatures or as a result of the backflow of greatly heated fuel in mixture-compressing injection internal combustion engines, whereby an excess pressure arises in the interior of the tank with respect to the atmosphere, exerting pressure on the fuel-filled conduits and thus preventing backflow of the fuel into the interior of the tank, whereby venting of the tank can no longer take place.

Another disadvantage of the prior art device is in that the sealing element of the equalizing vessel is arranged between spring members which tend to hold the sealing element in its rest position, resulting in a delay of the sealing-off step, so that fuel can penetrate via the conduit on the fuel side into the volume equalizing vessel, even before the blocking member can seal the respective vessel opening.

Accordingly, it is an object of the present invention to construct a device of the type described hereinabove in such a manner that in case of inclined positions of the fuel level, especially when vessels traverse alternatingly oriented curves, and with any quantities of gas which may be present in the fuel tank, pressure equalization between the interior of the tank and the atmosphere is ensured and efflux of fuel is prevented.

This object is attained, in a device of the type discussed above, in accordance with the present invention by associating the blocking members, respectively, with an orifice and positioning these blocking members upstream of such orifice, relative to the interior of the tank.

No damming-up of fuel can evolve in front of the opening leading to the volume equalizing vessel when traversing curves of alternating orientation or in the event that large quantities of fuel vapor are produced since the orifices form the entrance to the equalization vessel and the blocking members are located in front of these orifices so that they may be affected by the fuel, besides being acted on by the inertial forces, in the event of inclined positions of the fuel level. Thus, no fuel can penetrate into the vessel and pass to the outside via the equalizing conduit into the atmosphere, as contrasted to the conventional arrangement of such blocking members within the volume equalizing vessel.

In accordance with perferred embodiments of the invention, one blocking member seals the opening of the volume equalizing vessel on the fuel tank side before the fuel can penetrate through this opening into the vessel, while the blocking member of the opposite opening vacates the later in the event of an inclined orientation of the fuel tank, such that pressure equalization takes place between the interior tank and the volume equalizer vessel in communication with the atmosphere. If a minor amount of fuel collects in the vessel after several alternatingly oriented curves have been traversed, it is able to flow back via one or both of the openings into the fuel tank, so that overfilling of the volume equalizing vessel and thus exiting of the fuel through the equalizing conduit to the outside is precluded in any event.

Moreover, as compared with the prior art device, even in the event that the vehicle is in an upside-down position, for example, as the result of an accident, an efflux of fuel is still prevented in that the two blocking members, arranged separately and independently of each other, seal off the orifices, thus providing an additional safety feature.

In accordance with one embodiment of the invention, the volume equalizing vessel extends with its end faces almost up to the end walls of the tank, whereby large amounts of vaporized gas produced in the tank can be rapidly exhausted into the atmosphere, and any amount of leakage fuel collected cannot impair this pressure compensation.

In a further embodiment of the invention, the volume equalizing vessel can be provided with vent conduits for safety reasons, these conduits terminating at opposite tank end walls within the interior of the tank and extend from such a location to a location within the equalizing vessel adjacent an opposite end face thereof so that even in the case of an undesirable blockage of one or both vessel openings, venting of the tank still can take place. Preferably, these venting conduits are arranged so as to be inclined with their end within the equalizing vessel being higher than their end within the fuel tank, whereby the fuel which has entered the venting conduits in case of inclined positions of the fuel level can rapidly flow back into the interior of the tank.

In accordance with still a further feature of the invention, the volume equalizing vessel may be provided with an auxiliary chamber formed centrally beneath its vessel bottom, this auxiliary chamber having a larger volume than that of the volume equalizing vessel. As a result of this construction, in the event that fuel has flowed into the interior of the vessel via the venting conduits as a result of the vehicle being placed in an upside-down position, and has filled the equalizing vessel, should the vehicle be subsequently brought into a lateral position, flow back in the interior of volume equalizing vessel is maintained below the level of the atmospheric equalizing conduit. The auxiliary chamber is dimensioned so that, with maximum filling of the vessel, the chamber (located beneath the equalizing conduit) is able to receive a sufficient quantity of fuel so as to prevent an efflux of the fuel from the equalizing vessel to the outside via the equalizing conduit.

In a modified embodiment of the invention, the venting conduits are formed integrally with the volume equalizing vessel. This arrangement makes it possible to manufacture the device of this invention in a simple way and without additional expenditure for assembly work.

A further, simplified embodiment, is possible by omitting the venting conduits altogether, whereby functioning of the device of this invention is still ensured.

These and other objects, features and advantages of the present invention will become more apparent from the following description when taken in connection with the accompanying drawings which show, for the purposes of illustration only, several embodiments in accordance with the present invention and wherein:

DETAILED DESCRIPTION OF THE PREFERRED EMBODIMENT

Figure 1:
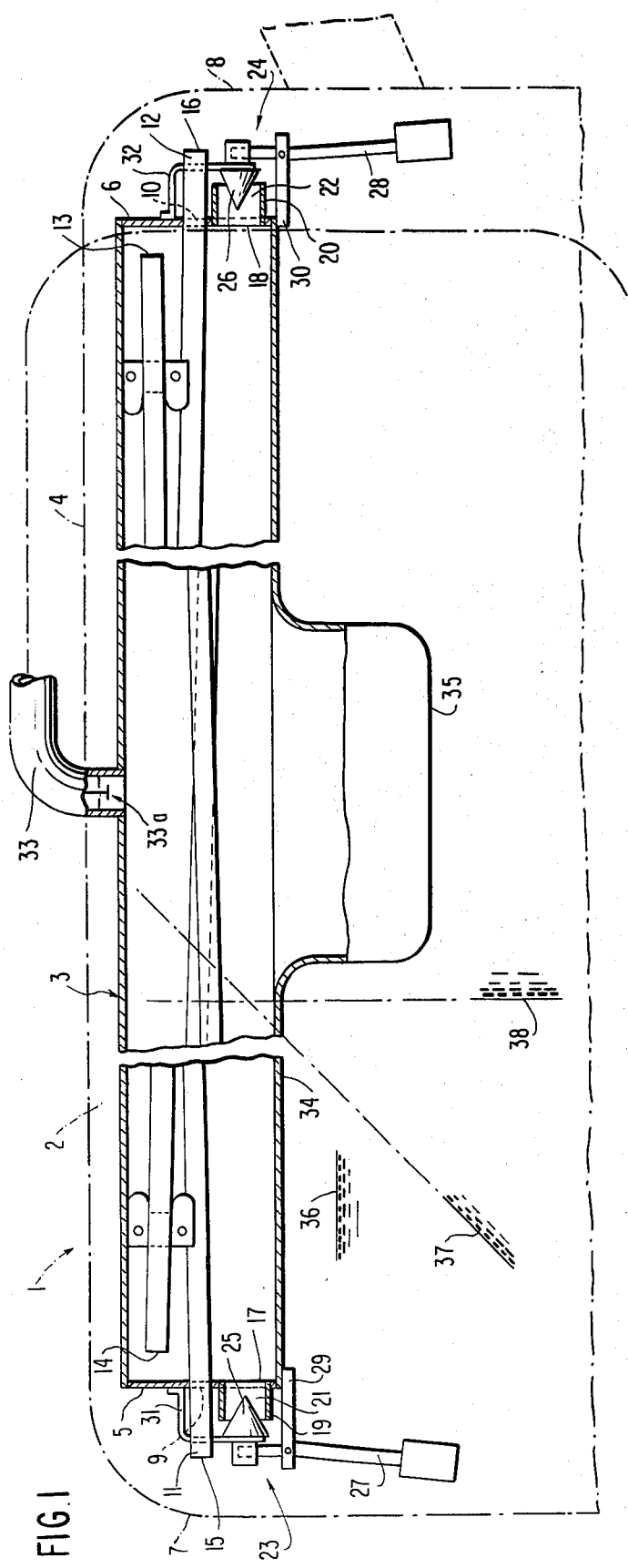
FIG. 1 shows an upper zone of a fuel tank in accordance with one embodiment of the invention in a longitudinal sectional view.

FIG. 1 shows an upper zone of a fuel tank indicated generally at 1. Affixed within the interior 2 of the tank 1 is an elongated, essentially tubular, volume equalizing vessel, which is installed at right angles to the longitudinal axis of the vehicle. The equalizing vessel 3 is located so as to extend closely underneath the upper wall section 4 of the fuel tank 1 reaching from an end face 5 adjacent and almost reaching a side end wall 7 of the tank to a like end wall 6 being similarly positioned with regard to side end wall 8 of the fuel tank 1. The end faces 5 and 6 of the vessel 3 are each provided with an insert opening 9, 10, respectively through which a venting conduit 11, 12 extends. Each of the venting conduits 11, 12 terminates, on the one hand, outside of the volume equalizing vessel 3 in close proximity to a tank end wall 7 or 8, and on the other hand, within the volume equalizing vessel 3, close to an opposite end face 5 or 6. The venting conduits 11, 12 are arranged within the volume equalizing vessel in an inclined manner so that a conduit end 13 or 14 is higher than the respective conduit end 15 or 16 that terminates within the interior 2 of the tank 1.

Underneath the insert openings 9 and 10, the end faces 5 and 6 of the equalizing vessel 3 are provided with a further aperture 17, 18, respectively, into which is introduced a respective pipe connection 19, 20. The openings 21, and 22 of the pipe connections 19 and 20 are each equipped with a blocking member 23 or 24. The blocking members 23 and 24 comprise a conically fashioned sealing element 25, 26 connected with a weighted pendulum loosely hanging in a depending manner within the interior 2 of the tank and angled in a direction toward the tank side end walls 7, 8, respectively. Each of the sealing elements 25, 26 are pivotally attached by way of a mounting 29, 30, respectively, with the volume equalizing vessel 3. The pivoting range of the blocking members 23 and 24 is limited by stops 31 and 32. Instead of the angled pendulums, an arrangement may also be provided wherein the pendulums are offset in configuration or are mounted under pretensioning.

The sealing elements 25 and 26 of the blocking members may also be associated directly with the vessel openings 17 and 18 which also may be arranged above the insert openings 9 and 10 instead of therebelow. Additionally, the blocking members 23, 24 may be attached to the tank end walls 7 and 8 by way of mountings instead of to the vessel itself.

Arranged centrally upon the upper wall of the equalizing vessel 3 is an equalizing conduit 33 which communicates with the atmosphere through the upper wall portion 4 of the fuel tank 1. The conduit 33 can be additionally equipped with a valve 33a located in the region where the conduit terminates at the vessel 3.

Underneath the conduit 33, the vessel bottom is provided with a centrally located auxiliary chamber 35. In the illustrated embodiments, the equalizing vessel 3 is of a cylindrical tubular form, while the auxiliary chamber is formed of an approximately rectangular configuration. Furthermore, the auxiliary chamber 35 is dimensioned so that with maximum filling of the vessel (as with the previously noted upside-down positioning of the tank) an efflux of fuel into the atmosphere is prevented, the auxiliary chamber preferably having a larger capacity than that of the equalizing vessel proper.

Reference numeral 36 represents the fuel level within the tank when the fuel is at rest, and an inclined position is represented at 37, while 38 illustrates a sideways position.

For example, if a left-hand turn is being traversed, the fuel level assumes the inclined position 37 under the effect of centrifugal or inertial forces. At the same time, the blocking member 24 closes the opening 22 of the volume equalizing vessel 3 under the pressure of the liquid fuel. The pendulum 28 is fashioned so that it seals the opening 22 as soon as even small centrifugal or inertial forces are imposed. Consequently, no fuel can enter the opening 22 into the interior of the vessel 3. This behavior is still further enhanced by the fact that the blocking member 24 is limited in its movement away from the opening 20 by way of a stop 32, whereby the closing time of the blocking member 24 is shortened. Simultaneous closing of the opening 22 by the pendulum shifted blocking member 26, the opening 21 at the opposite end face 5 of the vessel is vacated by blocking member 23 such that excess pressure within the tank interior 2 may escape by way of the opening 21, as well as by way of the conduit end 15 of the venting conduit 11 which terminates within the tank interior 2. From the interior of the vessel 3, the excess pressure is vented to the atmosphere by way of equalizing conduit 33.

When, subsequently, a right-hand curve is traversed, the blocking member 23 closes the opening 21, whereas the blocking member 24 vacates the opening 22 that it closed during traversing of the left-hand curve.

Any fuel which has entered as a result of inclined positions of the fuel tank, via the conduit end 15 or 16 into the venting conduit 11 or 12, respectively, flows back into the tank interior 2 when the automobile traverses the curve oriented in the opposite direction or when travelling straight ahead as a result of the inclined arrangement the venting conduits 11 and 12.

If the fuel tank 1 is in an upside-down position, both blocking members 23 and 24 seal the openings 21 and 22 of the vessel 3, so the fuel can only pass into the volume equalizing vessel 3 via the conduit ends 15 and 16 of the venting conduits 11 and 12. The atmospheric end of the equalizing conduit 33 terminates above the fuel level of tank 1 (as represented by the dot-dash line emanating from conduit 33 in FIG. 1), so that efflux of fuel is impossible. Furthermore, the conduit 33 can also be closed off by the valve 33a even before fuel can enter into this conduit so that fuel will not drain from the conduit 33 when the vehicle is righted. Additionally, if the fuel tank is subsequently brought to a level position after being inverted so that fuel level 38 is achieved, the blocking member 23 vacates the opening 21, whereby a pressure equalization occurs between the tank interior 2 and the atmosphere, so that the fuel which has entered the vessel 3 while in an upside-down position drops within the vessel and within the auxiliary chamber 35 to a level below the level of the equalizing conduit 33, whereby efflux of fuel therethrough is avoided. When the vehicle is returned to a normal orientation, backflow of fuel from the equalizing vessel to the fuel tank takes place as described hereinabove in connection with driving through curves.

This device for venting fuel tanks is also reliable and effective upon the occurrence of maximally large amounts of fuel vapor.

Figure 2:
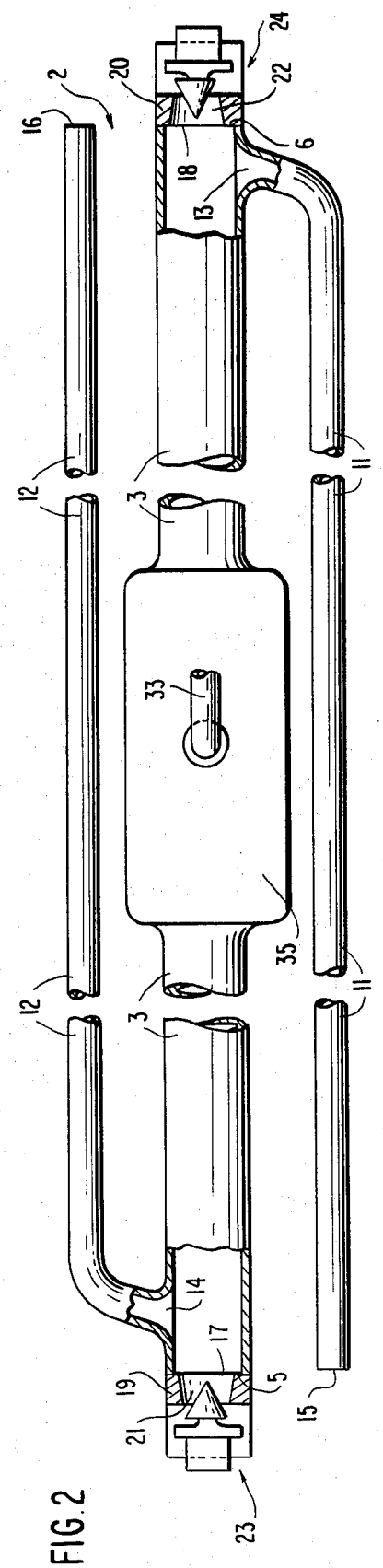
FIG. 2 is a plan view of a second embodiment in accordance with the present invention.

FIG. 2 shows another embodiment of the device for the venting of fuel tanks in accordance with the present invention with elements thereof corresponding to elements of the FIG. 1 embodiment, bearing like reference numerals. In this embodiment, the venting conduits 11 and 12 are formed integrally with the equalizing vessel 3. These conduits have ends 13 and 14 which are an open connection to the interior of the volume equalizing vessel 3, while their opposite ends 15 and 16, respectively, terminate into the interior 2 of the tank 1 in the proximity of the tank end walls of the fuel tank, which latter are not shown in FIG. 2, but are as shown in FIG. 1. Thus, in this embodiment, the venting conduits 11, 12 are located exteriorly of the equalizing vessel 3 as opposed to the situation in FIG. 1 wherein the conduits are located primarily within the equalizing vessel; however, the same inclined orientation may still be retained. Pipe connections 19 and 20 are formed at the end faces 5 and 6 of the vessel 3, and the openings 21 and 22 of these pipe connections being each associated with a blocking member 23 and 24.

The mode of operation of the embodiment of FIG. 2 is the same as described in connection with FIG. 1.

In the examples illustrated and described hereinabove, the device for venting of fuel tanks in accordance with the present invention may also be designed without the arrangement of the venting conduits 11, 12. In such an event, pressure equalization takes place between the tank interior and the volume equalizing vessel connected to the atmosphere only via the openings of the volume equalizing vessel. Any leakage of fuel is also in this case effectively avoided in all positional conditions of the fuel tank and with any existing amounts of fuel vapor which may be produced.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A device for venting automotive vehicle fuel tanks, comprising a volume equalizing vessel arranged in an upper zone of the interior of a fuel tank, said volume equalizing vessel being in communication with the atmosphere by equalizing conduit means, said volume equalizing vessel having outlet opening means disposed at opposite ends thereof close to respective side end walls of the fuel tank extending in a longitudinal direction with respect to the longitudinal direction of the vehicle, each said outlet opening means closable by a blocking element means pivotally mounted exteriorly of the volume equalizing vessel and connected with a weighted means swingably hanging in a depending manner in the tank below said blocking element means, wherein one of said weighted means causes the respective connected blocking element means to close one respective outlet opening means at one end of the volume equalizing vessel and another weighted means causes the respective connected blocking means to open a respective outlet opening means at an opposite end of the volume equalizing vessel when the fuel tank is inclined.

2. The device according to claim 1, wherein the ends of the volume equalizing vessel extend almost to the tank side end walls.

3. The device according to claims 1 or 2, wherein the volume equalizing vessel is provided with venting conduits.

4. The device according to claim 3, wherein each of the venting conduits has an end which terminates near an opposed one of said tank side end walls, within the interior of the tank, and extend from said end to an opposite vessel end face where they terminate within the volume equalizing vessel.

5. The device according to claim 4, wherein the venting conduits are inclined.

6. The device according to claim 5, wherein the venting conduits are fashioned integrally with the volume equalizing vessel.

7. The device according to claim 4, wherein the volume equalizing vessel is provided with an auxiliary chamber formed centrally underneath its vessel bottom.

8. The device according to claim 7, wherein the auxiliary chamber has a larger volume than that of the volume equalizing vessel.

9. The device according to claim 4, wherein the venting conduits are fashioned integrally with the volume equalizing vessel.

10. The device according to claim 3, wherein the venting conduits are fashioned integrally with the volume equalizing vessel.

11. The device according to claims 1 or 2, wherein the volume equalizing vessel is provided with an auxiliary chamber formed centrally underneath its vessel bottom.

12. The device according to claim 11, wherein the auxiliary chamber has a larger volume than that of the volume equalizing vessel.

13. The device according to claim 1, wherein the weighted means is angled in a direction toward an adjacent one of the tank end walls.

14. The device according to claim 1 or 13, wherein the blocking element means are conically shaped.

* * * * *